US010228109B2

(12) United States Patent
Hartisch

(10) Patent No.: US 10,228,109 B2
(45) Date of Patent: Mar. 12, 2019

(54) ILLUMINATION DEVICE FOR A MOTOR VEHICLE WITH A SAFETY DEVICE TO DETECT FAILURE STATES, AND METHOD FOR DETECTION OF FAILURE STATES

(71) Applicant: Audi AG, Ingolstadt (DE)

(72) Inventor: Michael Hartisch, Grünhain-Beierfeld (DE)

(73) Assignee: AUDI AG, Ingolstadt (DE)

( * ) Notice: Subject to any disclaimer, the term of this patent is extended or adjusted under 35 U.S.C. 154(b) by 73 days.

(21) Appl. No.: 15/321,704

(22) PCT Filed: Jun. 11, 2015

(86) PCT No.: PCT/EP2015/001178
§ 371 (c)(1),
(2) Date: Dec. 22, 2016

(87) PCT Pub. No.: WO2015/197163
PCT Pub. Date: Dec. 30, 2015

(65) Prior Publication Data
US 2017/0138559 A1 May 18, 2017

(30) Foreign Application Priority Data
Jun. 27, 2014 (DE) .................. 10 2014 009 594

(51) Int. Cl.
F21S 8/10 (2006.01)
F21S 45/10 (2018.01)
(Continued)

(52) U.S. Cl.
CPC ............ *F21S 45/10* (2018.01); *B60Q 11/005* (2013.01); *F21S 41/14* (2018.01); *F21S 41/16* (2018.01);
(Continued)

(58) Field of Classification Search
CPC ....... F21S 41/37; F21S 45/10; F21V 23/0457; F21Y 2115/30
See application file for complete search history.

(56) References Cited

U.S. PATENT DOCUMENTS

2006/0227561 A1* 10/2006 Childers ................ G03B 21/16
362/373
2009/0040765 A1* 2/2009 Van De Voorde ..... G03B 21/16
362/294
(Continued)

FOREIGN PATENT DOCUMENTS

CN 10348182 A 1/2014
CN 103547896 A 1/2014
(Continued)

OTHER PUBLICATIONS

English Machine Translation of EP 0859118 provided by ESPACENET.*
(Continued)

*Primary Examiner* — Zheng Song
(74) *Attorney, Agent, or Firm* — Seed IP Law Group LLP

(57) ABSTRACT

The disclosure concerns an illumination device for a motor vehicle, with a laser light source that is designed to emit light, with a reflector comprising a reflection side that is designed to reflect light and comprises an electrically conductive layer, and an outside that faces away from the reflection side and is arranged on the opposite side. Furthermore, the illumination device has a safety device to detect failure states of said illumination device. The safety device has at least one inductive sensor that is arranged externally relative to the reflector, such that the outside of the reflector is facing toward the inductive sensor and the reflection side of the reflector is facing away from the inductive sensor, wherein the safety device is designed to detect a temperature
(Continued)

change of at least one region of the reflection side of the reflector by the inductive sensor.

15 Claims, 1 Drawing Sheet

(51) Int. Cl.
    *F21S 41/14*     (2018.01)
    *F21S 41/37*     (2018.01)
    *B60Q 11/00*     (2006.01)
    *F21S 41/32*     (2018.01)
    *F21S 41/16*     (2018.01)
    *B60Q 1/00*     (2006.01)
    *F21Y 115/30*     (2016.01)

(52) U.S. Cl.
    CPC ............... *F21S 41/32* (2018.01); *F21S 41/37* (2018.01); *B60Q 1/0023* (2013.01); *F21Y 2115/30* (2016.08)

(56) References Cited

U.S. PATENT DOCUMENTS

2010/0033948 A1* 2/2010 Harbers ................. F21V 17/02
    362/84
2011/0038172 A1* 2/2011 Vollmer ................... F21V 3/04
    362/543
2011/0063115 A1 3/2011 Kishimoto
2011/0254554 A1* 10/2011 Harbers ............. H05B 33/0893
    324/414
2014/0198824 A1 7/2014 Nagl et al.
2014/0334167 A1 11/2014 Tiefenbacher
2015/0316230 A1* 11/2015 Harbers ................... F21V 7/10
    362/277

FOREIGN PATENT DOCUMENTS

| DE | 102 43 127 A1 | | 3/2004 | |
|----|---|---|---|---|
| DE | 10 2011 110 666 A1 | | 11/2012 | |
| DE | 102012220476 | * | 12/2013 | ........... B60Q 1/0023 |
| DE | 10 2012 220 481 A1 | | 5/2014 | |
| EP | 0859188 | * | 8/1998 | ............... B60Q 1/00 |
| EP | 1156271 | * | 11/2001 | ............. B60Q 11/00 |
| JP | 2013-168586 A | | 8/2013 | |
| WO | 2013/096894 A1 | | 7/2013 | |

OTHER PUBLICATIONS

English Machine Translation of EP 1156271 provided by ESPACENET.*
English Machine Translation of DE 102012220476 provided by ESPACENET.*

* cited by examiner

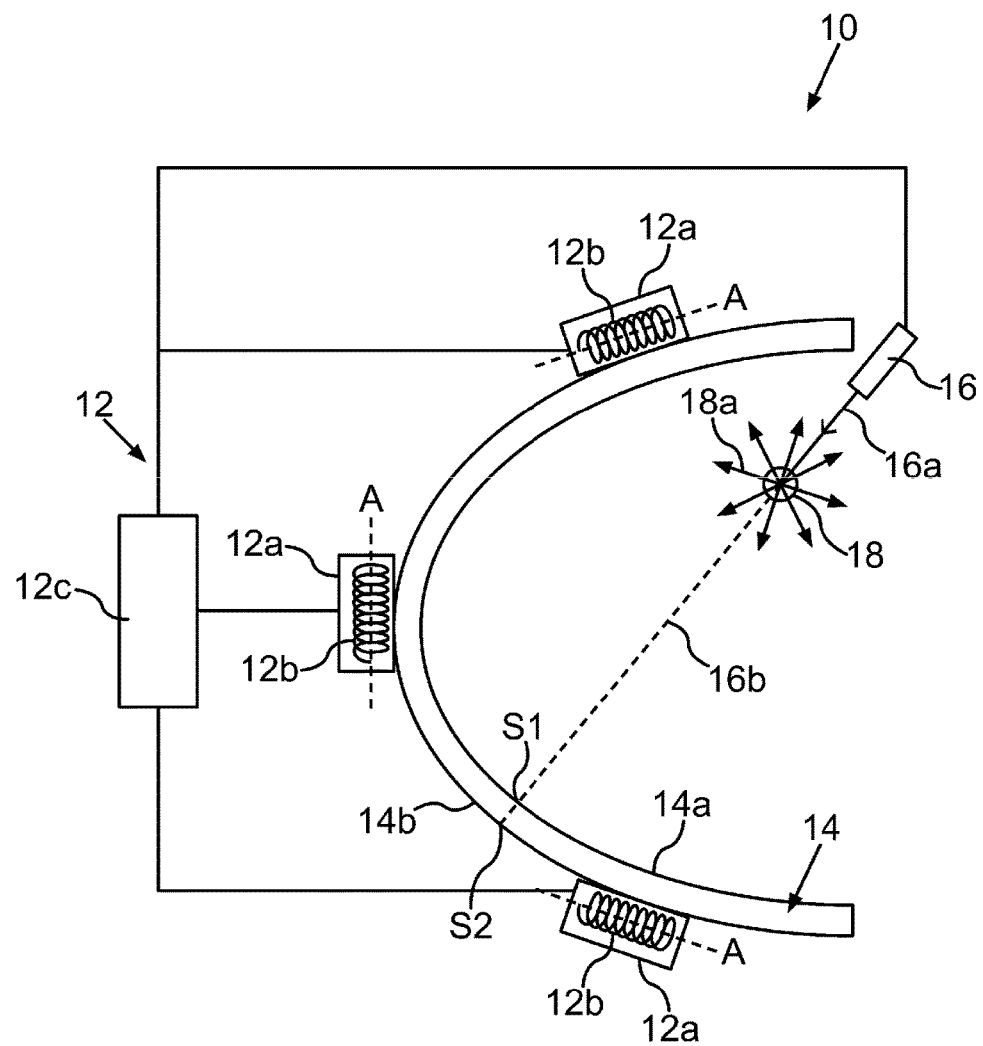

ILLUMINATION DEVICE FOR A MOTOR VEHICLE WITH A SAFETY DEVICE TO DETECT FAILURE STATES, AND METHOD FOR DETECTION OF FAILURE STATES

BACKGROUND

Technical Field

The disclosure relates to an illumination device for a motor vehicle, wherein the illumination device has a laser light source that is designed to emit light, and a reflector having a reflection side that is designed to reflect light and comprises an electrically conductive layer, and having an outside that faces away from the reflection side and is arranged on the opposite side. Furthermore, the illumination device has a safety device to detect failure states of said illumination device. Furthermore, the disclosure relates to a method for the detection of failure states of an illumination device for a motor vehicle by means of a safety device.

Description of the Related Art

Headlights for motor vehicles which use lasers, particularly laser diodes, as a light source are known from the prior art. The light of the laser light source is thereby typically radiated toward a wavelength conversion element, such as, e.g., a luminophore) that converts the coherent, monochromatic laser light into white and no longer coherent light. The light emitted from the luminophore is reflected by a reflector and emitted via the light exit face of the headlight. The use of laser light sources in headlights thereby has the great advantage that much greater illumination strengths can thereby be achieved, and in addition to this arrangements that are very efficient in terms of design space are possible since laser light sources, such as, e.g., laser diodes, may be designed and arranged very compactly.

However, given the use of laser light sources it is problematic that laser light may be very dangerous to the human eye. Therefore, it must be ensured that the laser light cannot escape from the light exit face of the headlight. Therefore, safety devices that detect malfunctions and deactivate the laser light source in the event of failure are known from the prior art.

For example, US 2011/0063115 A1 describes a headlight with a laser light source and with photosensors as part of a safety device. The laser light of the laser light source, which is arranged at the back side, behind the reflector, is thereby injected into the reflector via a transmission opening in said reflector and radiated onto a luminophore, which for its part again emits light that is radiated in part toward the reflector and is reflected by this. The reflector thereby has an additional transmission opening at which the photosensor is arranged at the back side of said reflector. If a defect is present, the photosensor may detect this via an intensity change at the site of the photosensor, whereupon the laser light source may be deactivated.

Furthermore, a safety device for headlights with laser light sources is known from WO 2013/096984 A1. This safety device uses various sensors in order to establish safety-critical states, and to deactivate the laser light sources upon establishing such a state. On the one hand, sensors are thereby provided in the headlight itself, for instance a positional sensor for the positioning of the laser light source, a phosphor sensor which monitors the state of the phosphor or, respectively, luminophore, and also a covering glass sensor for the headlight unit. On the other hand, sensors at the vehicle and control signals are used, for example in order to detect if the vehicle has been in an accident or a collision, for example an acceleration sensor or the signal of an airbag control device.

The implementation of such safety devices can therefore be accomplished only at a very high technical cost. In addition to this, perturbations in the illumination quality cannot be avoided given the use of sensors in the light generation region, i.e., at the reflecting side of the reflector, and—in contrast to this—transmission openings and cutouts from the reflector surface are required given a rear-side arrangement at the reflector, which likewise has a disadvantageous effect on the light properties of the headlight since the area of the reflector that is usable for reflection is thereby reduced.

BRIEF SUMMARY

According to aspects of the present invention, an illumination device with a safety device for detection of failure states of the illumination device for a motor vehicle, and a method for the detection of failure states, are provided, by means of which a monitoring of the illumination device can be accomplished in an optimally certain, simple manner, and in a manner that interferes as little as possible with the light output or illumination properties.

The illumination device according to embodiments of the invention for a motor vehicle has a laser light source that is designed to emit light. Here, light is to be generally understood as electromagnetic radiation, and preferably as a radiation in a wavelength range including the visible wavelength range, infrared range and UV range. Furthermore, the illumination device has a reflector with a reflection side that is designed to reflect light and comprises an electrically conductive layer, and with an outside that faces away from the reflection side and is arranged on the opposite side. Furthermore, the illumination device has a safety device to detect failure states of said illumination device. For this, the safety device comprises at least one inductive sensor that is arranged externally relative to the reflector, such that the outside of the reflector is facing toward the inductive sensor and the reflection side of the reflector is facing away from the inductive sensor, wherein the safety device is designed to detect a temperature change of at least one region of the reflection side of the reflector by means of the inductive sensor.

Embodiments of the invention are thereby based on the realization that the presence of a failure state can be concluded via local or also global temperature changes of the reflection side. Moreover, embodiments of the invention are furthermore based on the realization that the influences of temperature changes on inductive sensors which influences are normally perceived to be interfering and as falsifying measurements may be particularly advantageously used in order to detect temperature changes by means of inductive sensors. The use of an inductive sensor according to embodiments of the invention thereby has the particularly great advantage that a temperature change may be detected in an extremely certain, fast, precise and non-interfering manner. This could not be accomplished via typical temperature sensors since, given an external attachment to the reflector, temperature changes could be detected via the outside only with a time delay, and temperature changes of the reflection side itself could not be directly detected. However, in the event of failure, such time delays are unacceptable. In order to enable an optimally quick temperature change measurement of the reflection face of the reflector with temperature sensors, these would need to be arranged on the reflection face itself or at least in a region on the reflection face side, which does, however, again entail enormous perturbations in the illumination properties. In contrast to this, via the use of inductive sensors it is possible to detect a temperature change of the reflection face itself, directly and without time delay, and at the same time to arrange the inductive sensors externally. In addition to this, due to the inductive temperature change detection it is also the case that no clearances, transmission openings or cutouts in the reflector are required, whereby a reduction of the illumination quality is in turn avoided. Moreover, inductive sensors may be of technically very simple and cost-effective design, and moreover they do not take up much design space. Due to the external arrangement, they do not reduce the illumination quality of the illumination device, and the reflectors also do not need to be provided with clearances via complicated special designs. No particular demands are to be made on the embodiment of the reflectors, either. Typical reflectors may have reflecting metallic coatings that is therefore also electrically conductive. An inductive temperature change detection of the reflection side is therefore possible without needing to make extra preparations of the reflector for this, since the electrical conductivity of the reflection side that is required for the inductive temperature change detection is already provided by the reflective coating itself. Therefore, a monitoring of the illumination device can be accomplished via embodiments of the invention in a manner that is certain, simple, and does not affect the light output or the illumination properties.

In an advantageous embodiment of the invention, the inductive sensor comprises a coil, wherein the sensor is designed to generate, by means of the coil, a magnetic field varying over time, particularly periodically. This may take place simply via application of an alternating voltage to the coil, or in general by charging the coil with a current with an amperage varying over time. The inductive sensor is thereby designed to induce an induction current in the electrically conductive layer of the reflection side of the reflector. The temporally varying magnetic field that is generated by the coil thereby in particular induces eddy currents in the electrically conductive layer of the reflector. These eddy currents in turn thereby themselves generate a magnetic field that superimposes on that of the coil. Temperature changes of the electrically conductive layer thereby change the amperage of the eddy currents, and therefore the magnetic field generated by these, in particular in terms of its strength. Temperature changes of the electrically conductive layer may therefore be detected directly and quickly in a simple manner via the inductive sensor due to the interaction of the magnetic field generated by the eddy currents with the magnetic field of the coil. For example, for this the resistance in the magnetic field of the coil may be measured, and the temperature change in the region of the electrically conductive layer may be detected via a resistance change.

In an advantageous embodiment of the invention, the laser light source is arranged such that it emits laser light in the direction of the reflection side of the reflector during operation such that at least a theoretical, straight-line projection of a light beam of the laser light strikes the reflection side of the reflector, thus for example such that the intersection point of the projection of the laser beam with the reflection side in the propagation direction of the laser beam is situated before a theoretical intersection point of the laser beam with the outside of the reflector. In particular, it may be assumed here that the laser light source emits the laser light in the form of a single light beam. Furthermore, the theoretical straight-line projection of the light beam is to be understood such that additional elements may be provided, for example a luminophore element onto which the laser light is radiated, such that the laser light beam itself does not strike the reflection side of the reflector but rather the theoretical projection of this light beam, thus as if, e.g., the luminophore element were not present. In other words: the reflection side of the reflector of the laser light source is placed closer in the light emission direction of said laser light source than the outside of the reflector, and the laser light is therefore radiated directly into the reflector. On the one hand, this has the great advantage that transmission openings through which the laser light is injected into the reflector thus do not need to be provided in the reflector, which thus in turn prevents a negative effect on the illumination quality due to the loss of additional reflective regions of the reflector. The laser light source may thereby be arranged on the reflection side relative to the reflector; in particular, in the event of a flat reflector, the reflector is arranged between the laser light source and the at least one inductive sensor. In the event of a non-planar reflector, in particular a curved reflector whose circumferential boundary defines a boundary of a light exit opening of the reflector through which the reflected light exist, the laser light source may be arranged in an identical manner, i.e., that the reflector is arranged between the laser light source and the inductive sensor, or the laser light source may also be arranged such that the laser light beam is injected into the reflector through the light exit opening of said reflector. This enables a lateral injection of the laser light into the reflector, such that the laser light source itself does not need to be arranged within the reflector, which again reduces perturbations. A significant advantage given these embodiments is that, in the event of failure such as for example a defect at the luminophore, a position change of the luminophore element or a saturation of the luminophore such that radiated laser light passes through the luminophore without being converted, the laser light radiates directly onto the reflection side of the reflector in the event of such a malfunction, which leads to a temperature increase, particularly in the region of the reflection side which is being exposed, and the temperature increase may then be detected virtually instantaneously via the inductive sensor. Since, in most failure cases, laser light is radiated directly onto the reflection side given such an arrangement of the laser light source, a very fast and severe temperature increase that results from this is to be detected particularly reliably. Given such an arrangement of the laser light source, the risk is additionally not present that the laser light is radiated directly outward via the light exit face of the reflector if a defect occurs.

Given an additional, particularly advantageous embodiment of the invention, the inductive sensor, in particular the coil of the inductive sensor, is arranged mechanically contacting the outside of the reflector. An optimal functionality of the inductive sensor is thereby provided since the clearance of the inductive sensor from the reflection side is minimized. At the same time, the detection region of the sensor can therefore be maximized. In addition to this, an arrangement that is particularly efficient in terms of design space is provided via this embodiment. In order to furthermore optimize the functionality, it is provided that the coil axis is aligned along the reflection side, i.e., in a direction tangential to the reflection side.

In a further advantageous embodiment of the invention, the reflector is formed from an electrically non-conductive material, e.g., plastic, that is at least coated with the electrically conductive layer so that the outside of the reflector is formed from the electrically non-conductive material. This embodiment on the one hand enables a particularly cost-effective design of the reflector. On the other hand, however, the particularly great advantage of this embodiment is that exclusively temperature changes at the reflection side of the reflector are detected by the inductive sensor, since the remaining part of the reflector since the remaining part comprises the outside that is comprised of electrically non-conductive material does not interact with the changing magnetic field of the coil. Temperature changes of the reflection side of the reflector may thereby be detected with markedly greater precision.

Given a further advantageous embodiment of the invention, the safety device is designed to deactivate the light source in the event that a temperature and/or temperature change of the region of the reflection side of the reflector that is detected by means of the inductive sensor exceeds a first predetermined limit value and/or falls below a second predetermined limit value. As described above, a failure state manifests itself in that laser light radiates directly onto the reflection side of the reflector, which leads to a significant temperature increase in this region of the reflection side. The deactivation of the laser light source upon detection of this temperature increase is therefore particularly advantageous. However, it may furthermore also be provided that the laser light source is also deactivated if a temperature change falls below a limit value. For example, additional instances may therefore be considered in which, due to a defect, the reflection side is no longer exposed—at least in regions—with the light intensity that corresponds to a functional, failure-free normal state, but rather is exposed to a reduced light intensity. Such failure states—for example, if the position of the luminophore has changed without laser light directly striking the reflector, or if the conversion efficiency of the luminophore is reduced due to too-severe heating and/or nearing the saturation range, or if the position of the laser light source has changed so that neither the luminophore nor the reflector is exposed by laser light—may then also manifest in a temperature reduction in at least one region of the reflection side, wherein this temperature reduction may likewise be detected via the inductive sensor, and the laser light source may be deactivated upon falling below the second limit value. A reliable detection of a multitude of failures and malfunctions is therefore provided particularly simply and quickly.

Given a further advantageous embodiment of the invention, the safety device has a plurality of inductive sensors. A predetermined detection region is thereby associated with each inductive sensor, and the number and arrangement of the inductive sensors on the outside of the reflector is preferably such that at least the majority and preferably the entirety of the reflection side of the reflector is covered by the detection regions of the inductive sensors. It can therefore be ensured that temperature changes may be detected particularly quickly and reliably in every region of the reflection side of the reflector, even if these only occur locally.

Multiple inductive sensors thereby have yet another advantage because the provision of multiple inductive sensors enables the embodiment of the invention such that the safety device is designed to geometrically determine the location of a partial region of the reflection side of the reflector in the event of a local temperature increase in said partial region. For example, at least two or three inductive sensors may be provided for this. A non-linear arrangement of three inductive sensors, i.e., the inductive sensors are arranged so that they form a non-degenerate triangle, is thereby particularly advantageous since the geometric location of the temperature change can thus be particularly precisely determined. The determination of the geometric location may thereby serve for a subsequent failure analysis, for example. Possible defects can therefore be localized and remedied particularly quickly.

The method according to an embodiment of the invention serves for the detection of malfunctions of an illumination device for a motor vehicle by means of a safety device. The illumination device thereby has a laser light source that is designed to emit light, and a reflector with a reflection side that is designed to reflect light and comprises an electrically conductive layer, and with an outside that faces away from the reflection side and is arranged oppositely. In the inventive method, a temperature change of at least one region of the reflection side of the reflector is detected by at least one inductive sensor or safety device that is arranged externally relative to the reflector, such that the outside of the reflector faces toward the inductive sensor and the reflection side of the reflector faces away from the inductive sensor.

The features, feature combinations and their advantages that are cited for the inventive illumination device and its embodiments apply similarly to the method according to embodiments of the invention. Moreover, substantive features cited in connection with the inventive illumination device and its embodiments enable the development of the inventive method via additional method steps.

BRIEF DESCRIPTION OF THE DRAWINGS

Additional advantages, features and details of the disclosure result from the claims, the following description of embodiments of the invention, and the drawing.

The single FIGURE shows a schematic depiction of an illumination device 10 for a motor vehicle with a safety device 12 according to an exemplary embodiment of the invention.

DETAILED DESCRIPTION

With reference to the FIGURE, the illumination device 10, such as, e.g., a headlight of the motor vehicle, hereby has a curved reflector 14 as an example. Depending on the use case and illumination strength distribution that is to be provided, the geometry of the reflector 14 may be of arbitrary design, for example may also be asymmetrical and/or faceted. Furthermore, the illumination device 10 has a laser light source 16 and a wavelength conversion element 18, in particular a luminophore element. The laser light source 16, such as, e.g., a laser diode, is aligned so that the light beam 16a emitted from the laser light source 16 strikes the wavelength conversion element. The wavelength conversion element converts the radiated, essentially monochromatic and coherent laser light 16a into light 18a of other wavelengths, in particular into light 18a of multiple different wavelengths, such that preferably essentially white light 18a is emitted from the wavelength conversion element 18.

Moreover, as needed the illumination device 10 may have still additional elements, in particular optical elements such as lenses, mirrors, etc. The light 18a released by the wavelength conversion element 18 is then reflected at least in part by the reflector 14 and is emitted via the light exit face of the illumination device 10.

For this, the reflector 14 has a reflection side 14a and an outside 14b situated opposite the reflection side 14a and facing away from said reflection side 14a. The wavelength conversion element 18 is thereby arranged in relation to the reflector 14 such that the reflection side 14a of the reflector 14 is facing toward the wavelength conversion element 18 and the outside of the reflector 14b is facing away from the wavelength conversion element 18. As depicted, the wavelength conversion element 18 may thereby also be laterally offset in relation to the reflector 14, or may not be arranged on an axis of symmetry of the reflector 14. It may thereby be achieved that reflected light does not strike the wavelength conversion element 18 again, or strikes the wavelength conversion element 18 only in a reduced proportion, and therefore the wavelength conversion element 18 itself does not have an interfering effect on the illumination strength distribution.

Furthermore, the laser light source 16 is arranged such that during operation this emits laser light 16a in the direction of the reflection side 14a of the reflector 14 such that at least a theoretical, straight-line projection 16b of the light beam of the laser light 16a strikes the reflection side 14a of the reflector 14, thus for example such that the intersection point S1 of the projection 16b of the laser beam 16a with the reflection side 14a in the propagation direction of the laser beam 16a is situated before a theoretical intersection point S2 of projection 16b of the laser beam 16a with the outside 14b of the reflector 14. The laser light source 16 therefore radiates directly into the reflector 14, without clearances in the reflector face needing to be provided.

The reflection side 14a of the reflector 14 furthermore has an electrically conductive and reflective, particularly metallic coating, or is formed from such a coating. The remainder of the reflector 14 is preferably formed from an electrically non-conductive material, for example from a plastic.

In order to ensure that no unconverted laser light 16a may escape to the outside via the light exit face in the event of a defect or a malfunction, a safety device 12 is provided that comprises at least one inductive sensor 12a. As an example, three inductive sensors 12a are depicted here. The geometric arrangement of the inductive sensors 12a is thereby dependent on the reflector geometry. The inductive sensors 12a have a predetermined detection region. The number and arrangement of the inductive sensors 12a is therefore preferably such that the detection regions cover the majority and preferably the entirety of the reflection side 14a, such that temperature changes may be detected in every region of the reflection side 14a. These inductive sensors 12a thereby respectively comprise a coil 12b whose coil axes A are preferably aligned in a tangential direction relative to the outside 14b or reflection side 14a of the reflector 14. Furthermore, these coils 12b are arranged optimally close to the outside 14b and preferably in contact with the outside 14b of the reflector 14. The detection region of the inductive sensors 12a can thereby be kept as large as possible, the sensitivity and precision can be optimized, and even a mount for the inductive sensors 12b can be provided in a particularly compact arrangement.

These coils 12b are charged with a current that varies over time in its amperage, for example with an alternating current. A magnetic field is thereby caused whose magnetic field strength or magnetic flux density likewise varies in magnitude over time. Eddy currents are thereby in turn induced in the electrically conductive layer of the reflection side 14a of the reflector 14, which for their part in turn generate a magnetic field. Since temperature changes of the reflection side 14a produce a change of the magnetic field generated by the eddy currents, the temperature changes may be detected via the interaction of this magnetic field with the coil magnetic field. The thermal variation of the metallic reflector surface, i.e., of the reflection side 14a, may, for example, be measured via the variation of the resistance in the magnetic field of the coils 12b. The inductive sensors 12a may furthermore be coupled with a control or evaluation device 12c that evaluates the sensor signals and decides between a failure-free function state and a failure state according to an evaluation logic. Given a determined detection of a failure state, the control or evaluation device 12c may deactivate the laser light source 16. If applicable, the control or evaluation device 12c may also determine the geometric location of a temperature increase by means of the sensor signals, and store this for later failure analysis purposes, for example. An arrangement of at least three coils 12b on the outside 14b of the reflector 14 is particularly suitable for this.

Therefore, a direct a delay-free temperature change detection of the reflection side 14a is advantageously possible without the inductive sensors 12a themselves needing to be provided at the reflection side 14a. If a detected temperature change in a region of the reflection side 14a exceeds a predetermined value, for example, the safety device 12 may deactivate the laser light source 16.

Failure states and malfunctions of a high-energy light system such as a laser-based headlight may advantageously be quickly and reliably detected via temperature variation at the optical face, i.e., the reflection side 14a. The converted radiation power may be determined in its sum and position by the inductive sensors 12a on the back side of the optically relevant face, i.e., the outside 14b of reflector 14, in particular via the variation of the magnetic field caused by the spatial temperature change in the event of a failure. In that the laser light source 16 radiates directly into the reflector 14, the risk may additionally be minimized that the laser light 16a exits directly from the illumination device 10 in the event of a failure, i.e., without being reflected by the reflector 14. Overall, the light exit face that illuminates the environment may thus be advantageously monitored directly, a critical radiation may be deactivated in the event of a failure, and furthermore perturbations may be minimized via the use of the inductive sensors 12a outside of the light generation.

The invention claimed is:

1. An illumination device for a motor vehicle, the illumination device comprising:
   a laser light source that is designed to emit light;
   a reflector having a reflection side that is designed to reflect light, an electrically conductive layer, and an outside that faces away from the reflection side and is arranged opposite to the reflection side; and
   a safety device for detecting failure states of the illumination device, the safety device comprising at least inductor that is arranged externally relative to the reflector, such that the outside of the reflector faces toward the inductor and the reflection side of the reflector faces away from the inductor, and wherein the inductor is designed to detect a change of temperature in the reflector.

2. The illumination device according to claim 1, wherein the laser light source is arranged such that, during operation, the laser light source emits laser light in the direction of the reflection side of the reflector such that at least one theoretical, straight-line projection of a light beam of the laser light strikes the reflection side of the reflector.

3. The illumination device according to claim 1, wherein the reflector is formed from an electrically non-conductive material that is at least coated with the electrically conductive layer so that the outside of the reflector is formed from the electrically non-conductive material.

4. The illumination device according to claim 1, wherein the inductor comprises a coil, and the coil is designed to generate a magnetic field changing over time.

5. The illumination device according to claim 4, wherein the coil of the inductor is arranged in mechanical contact with the outside of the reflector.

6. The illumination device according to claim 1, wherein the inductor is designed to induce an induction current in the electrically conductive layer of the reflector.

7. The illumination device according to claim 1, wherein the safety device is designed to deactivate the laser light source in the event that a temperature and/or a change of temperature in the reflector that is detected by inductor exceeds a first predetermined limit value and/or falls below a second predetermined limit value.

8. The illumination device according to claim 1, wherein the safety device has a plurality of inductors.

9. The illumination device according to claim 8, wherein, in the event of a local temperature increase in the reflector, the safety device is designed to determine a location of the local temperature increase.

10. The illumination device according to claim 1, wherein the inductor includes a coil having a coil axis that is tangential to the reflection side of the reflector.

11. A method of detecting failure states of an illumination device for a motor vehicle, wherein the illumination device includes a laser light source that is designed to emit light, a reflector having a reflection side that is designed to reflect light, an electrically conductive layer, and an outside that faces away from the reflection side and that is arranged opposite to the reflection side, and a safety device having an inductor for detecting the failure states of the illumination device, the inductor arranged externally relative to the reflector such that the outside of the reflector faces toward the inductor and the reflection side of the reflector faces away from the inductor, the method comprising:
 detecting change of temperature in the reflector using the inductor.

12. The method of claim 11 wherein detecting a change of temperature in the reflector using the inductor includes forming eddy currents within the electrically conductive layer of the reflector.

13. The method of claim 11 wherein detecting a change of temperature in the reflector using the inductor includes detecting an increase in temperature in the reflector using the inductor.

14. The method of claim 11 wherein detecting a change of temperature in the reflector using the inductor includes detecting a decrease in temperature in the reflector using the inductor.

15. The method of claim 11, further comprising determining a location of the change of temperature in the reflector.

* * * * *

UNITED STATES PATENT AND TRADEMARK OFFICE
CERTIFICATE OF CORRECTION

PATENT NO. : 10,228,109 B2
APPLICATION NO. : 15/321704
DATED : March 12, 2019
INVENTOR(S) : Michael Hartisch Page 1 of 1

It is certified that error appears in the above-identified patent and that said Letters Patent is hereby corrected as shown below:

In the Claims

Column 9, Line 13: Claim 7:
"by inductor" should read, --by the inductor--.

Column 10, Line 10: Claim 11:
"detecting change" should read, --detecting a change--.

Signed and Sealed this
Twenty-fifth Day of August, 2020

Andrei Iancu
*Director of the United States Patent and Trademark Office*